(12) United States Patent
Hodge

(10) Patent No.: US 9,541,708 B2
(45) Date of Patent: Jan. 10, 2017

(54) EXPANDED BEAM LENS ASSEMBLY

(71) Applicant: Molex, LLC, Lisle, IL (US)

(72) Inventor: Malcolm H. Hodge, Chicago, IL (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 14/781,666

(22) PCT Filed: Apr. 2, 2014

(86) PCT No.: PCT/US2014/032709
§ 371 (c)(1),
(2) Date: Oct. 1, 2015

(87) PCT Pub. No.: WO2014/165615
PCT Pub. Date: Oct. 9, 2014

(65) Prior Publication Data
US 2016/0054526 A1 Feb. 25, 2016

Related U.S. Application Data

(60) Provisional application No. 61/807,921, filed on Apr. 3, 2013.

(51) Int. Cl.
G02B 6/32 (2006.01)
G02B 3/00 (2006.01)
G02B 6/36 (2006.01)
G02B 6/26 (2006.01)
G02B 6/40 (2006.01)

(52) U.S. Cl.
CPC ............. *G02B 6/322* (2013.01); *G02B 3/0031* (2013.01); *G02B 3/0068* (2013.01); *G02B 6/262* (2013.01); *G02B 6/32* (2013.01); *G02B 6/3644* (2013.01); *G02B 6/3664* (2013.01); *G02B 6/40* (2013.01)

(58) Field of Classification Search
CPC ....... G02B 6/322; G02B 6/262; G02B 6/3644; G02B 6/3664; G02B 6/40; G02B 3/0031; G02B 3/0068
See application file for complete search history.

(56) References Cited

U.S. PATENT DOCUMENTS

| 4,421,383 A | * | 12/1983 | Carlsen | ................ | G02B 6/32 |
| | | | | | 385/72 |
| 4,531,810 A | * | 7/1985 | Carlsen | ................ | G02B 6/32 |
| | | | | | 385/137 |

(Continued)

FOREIGN PATENT DOCUMENTS

CN 201852958 U 6/2011

*Primary Examiner* — Peter Radkowski
(74) *Attorney, Agent, or Firm* — Jeffrey K. Jacobs

(57) ABSTRACT

An optical fiber assembly includes a lens block with a plurality of beam expanding and collimating elements. Each beam expanding and collimating element includes a first lens and a second lens. The first lens includes a generally arcuate first lens surface and the second lens includes a generally arcuate second lens surface generally complementary in shape and in contact with the first lens. Each lens has a different index of refraction. An optical fiber assembly may include a housing with a plurality of beam expanding elements. A front portion of each beam expanding element has a generally planar front surface. A compliant layer is positioned on the generally planar front surface of each beam expanding element.

16 Claims, 10 Drawing Sheets

(56) References Cited

U.S. PATENT DOCUMENTS

| | | | | |
|---|---|---|---|---|
| 4,534,616 A * | 8/1985 | Bowen | G02B 6/322 |
| | | | 385/79 |
| 4,822,129 A * | 4/1989 | Webb | G02B 6/322 |
| | | | 385/79 |
| 4,925,267 A * | 5/1990 | Plummer | G02B 6/32 |
| | | | 385/74 |
| 4,953,938 A * | 9/1990 | Buhrer | G02B 6/322 |
| | | | 385/33 |
| 5,208,648 A * | 5/1993 | Batchelder | G01N 21/9505 |
| | | | 356/237.1 |
| 5,220,403 A * | 6/1993 | Batchelder | G01N 21/9505 |
| | | | 250/358.1 |
| 9,025,917 B2 | 5/2015 | Aoki et al. | |
| 2003/0161596 A1* | 8/2003 | Register, III | G02B 6/4408 |
| | | | 385/106 |
| 2003/0223692 A1* | 12/2003 | Ikarashi | G02B 6/12004 |
| | | | 385/38 |
| 2006/0177182 A1* | 8/2006 | Mine | G02B 6/382 |
| | | | 385/74 |
| 2007/0263955 A1* | 11/2007 | Keen | G01N 21/0303 |
| | | | 385/12 |
| 2009/0303620 A1* | 12/2009 | Abe | G02B 7/021 |
| | | | 359/819 |
| 2010/0091387 A1* | 4/2010 | Hirao | B82Y 20/00 |
| | | | 359/793 |
| 2011/0243504 A1* | 10/2011 | Matsui | G02B 6/32 |
| | | | 385/74 |
| 2012/0177327 A1* | 7/2012 | Demeritt | G02B 6/327 |
| | | | 385/74 |
| 2012/0206639 A1* | 8/2012 | Matsui | G02B 13/0035 |
| | | | 348/340 |

* cited by examiner

EXPANDED BEAM LENS ASSEMBLY

REFERENCE TO RELATED APPLICATIONS

The Present Disclosure claims priority to prior-filed U.S. Provisional Patent Application No. 61/807,921, entitled "Expanded Beam Lens Assembly," filed on 3 Apr. 2013 with the United States Patent And Trademark Office. The content of the aforementioned Patent Application is incorporated in its entirety herein.

BACKGROUND OF THE PRESENT DISCLOSURE

The Present Disclosure relates, generally, to optical lens assemblies, and, more particularly, to a molded optical lens assembly for use with optical fiber expanded beam interfaces.

Optical fiber systems used in harsh environments often utilize an expanded beam interface to improve light transmission reliability. Expanded beam connectors include a lens mounted adjacent an end face of each fiber that expands the optical beam to minimize the impact of any foreign objects such as dust or debris between the optical fibers at the optical interface that may interfere with light transmission. Expanded beam connectors are also commonly used with optical fiber systems in high vibration environments since the expanded beam minimizes the effect of misalignment due to vibrations.

Some connector assemblies utilize an individual ball- or sphere-shaped lens aligned with each optical fiber. Other assemblies utilize a lens assembly having a plurality of lenses with each lens aligned with one of the optical fibers. Such multi-lens assemblies often have a generally planar rear face positioned adjacent front faces of the optical fibers and a front face including a plurality of convex lens elements. Other lens assemblies have generally planar front and rear surfaces with the front surface including a plurality of gradient or graded index lenses. Multi-lens assemblies may be somewhat costly due to their complexity and the tight tolerance control required during manufacturing. Accordingly, it is desirable to provide a multi-lens assembly that is relatively low cost with improved manufacturability.

SUMMARY OF THE PRESENT DISCLOSURE

In one aspect, an optical fiber assembly includes a body supporting a lens block and a plurality of optical fibers. Each optical fiber has an optical fiber axis and each of the optical fiber axes are generally parallel. A plurality of beam expanding and collimating elements are provided, with each beam expanding and collimating element being aligned with the optical fiber axis of one of the optical fibers. Each beam expanding and collimating element includes a first lens and a second lens. The first lens includes a generally arcuate first lens surface. The second lens includes a generally arcuate second lens surface. The first lens surface and the second lens surface are generally complementary in shape and in contact with each other. Each of the first lens and the second lens have a different index of refraction.

In another aspect, an optical fiber assembly includes a housing having a plurality of optical fibers and a plurality of generally parallel optical paths. Each optical path is aligned with one of the optical fibers and includes a beam expanding element. A front portion of each beam expanding element has a generally planar front surface. A compliant layer is positioned on the generally planar front surface of each beam expanding element.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which.

DESCRIPTION OF THE PREFERRED EMBODIMENTS

While the Present Disclosure may be susceptible to embodiment in different forms, there is shown in the Figures, and will be described herein in detail, specific embodiments, with the understanding that the Present Disclosure is to be considered an exemplification of the principles of the Present Disclosure, and is not intended to limit the Present Disclosure to that as illustrated.

As such, references to a feature or aspect are intended to describe a feature or aspect of an example of the Present Disclosure, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Figure 1:
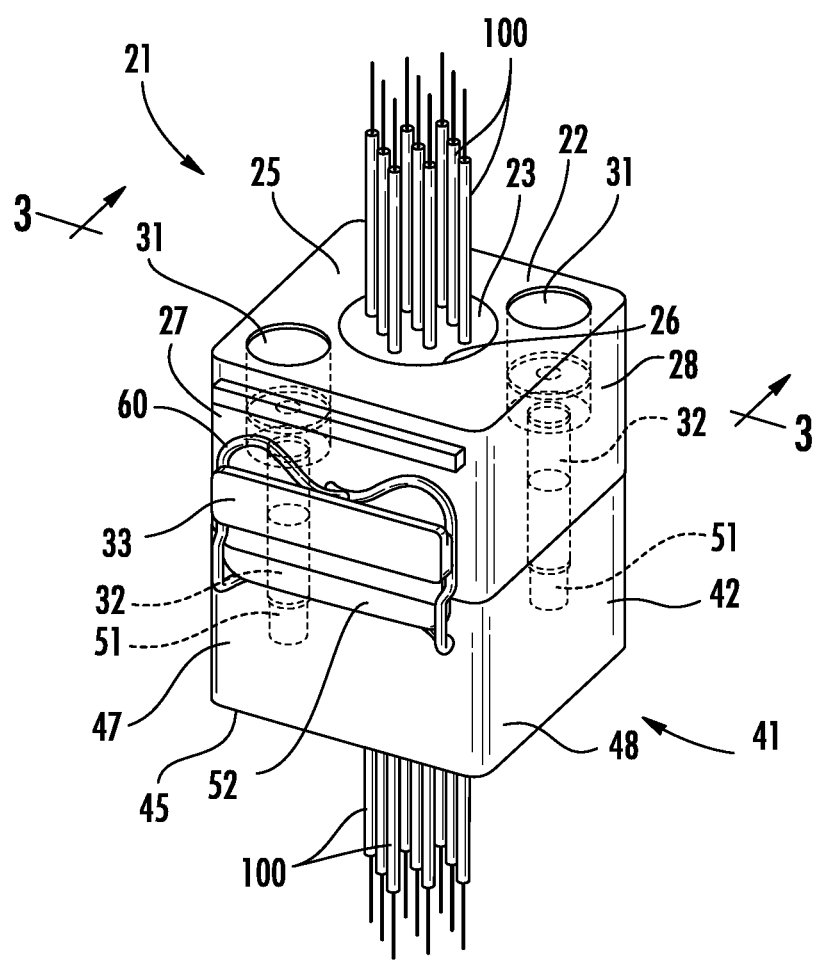
FIG. 1 is a perspective view of a pair of mating connectors in accordance with the Present Disclosure.
Figure 2:
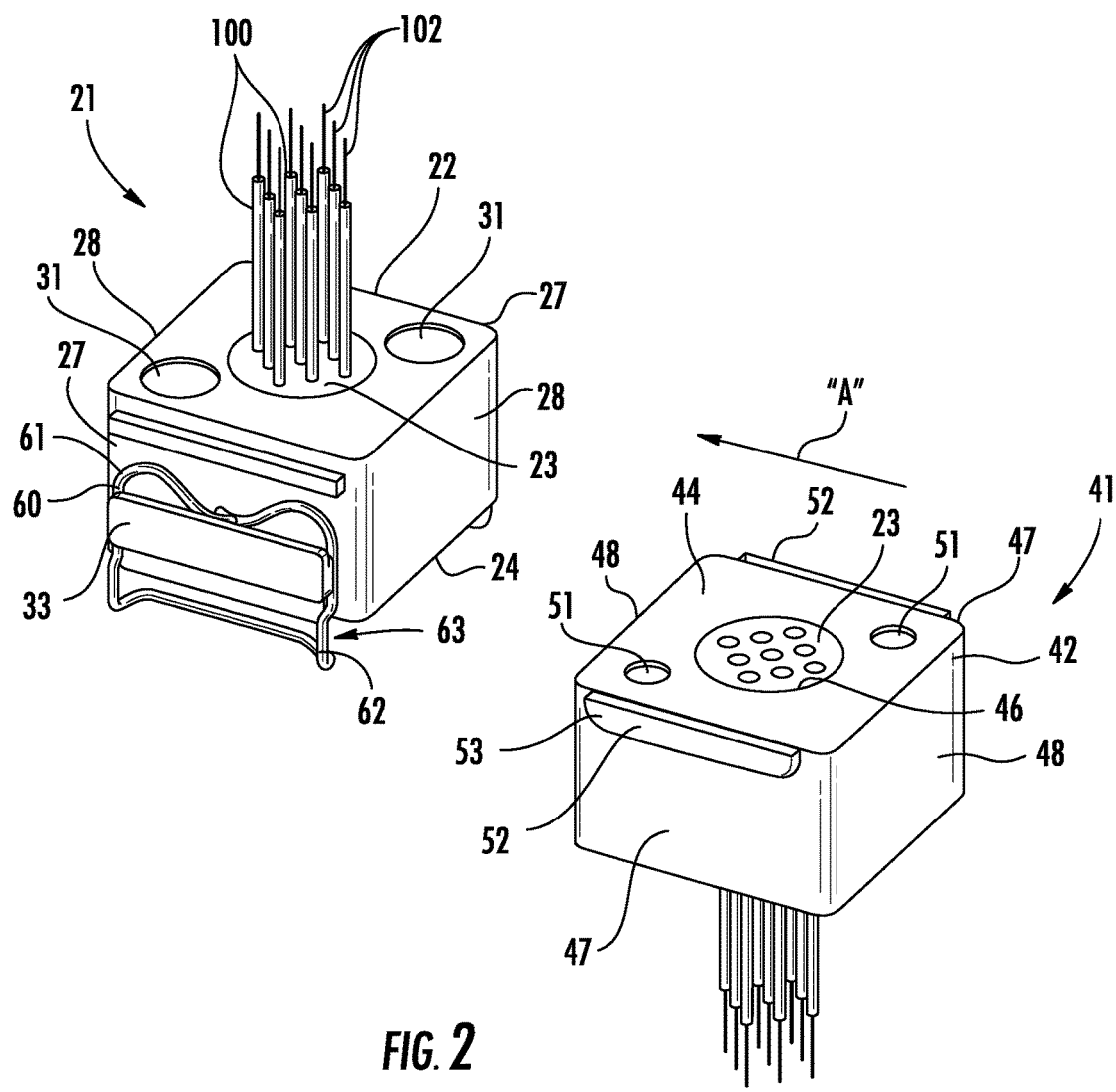
FIG. 2 is a perspective view of the pair of mating connectors of FIG. 1 laterally offset prior to mating.
Figure 3:
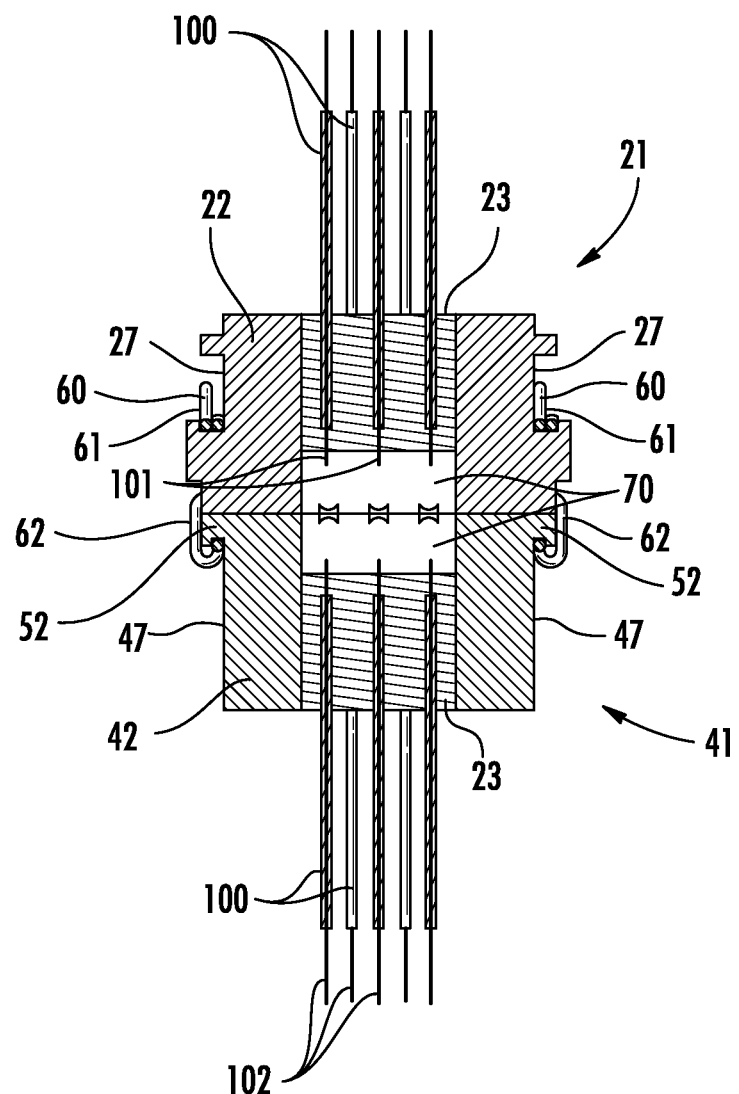
FIG. 3 is a sectional view of the pair of mating connectors of FIG. 1, taken generally along Line 3-3 of FIG. 1.

Referring to FIGS. 1-3, a pair of connectors mateable through lateral sliding movement is depicted. The upper connector 21 has an upper body or housing 22 with a central interface section 23 for securing and positioning a plurality of optical fibers 100. The lower connector 41 includes a lower body or housing 42 with a central interface section 23 for securing and positioning a plurality of optical fibers 100. If desired, upper housing 22 and lower housing 42 may be configured to have a shape other than the generally rectangular configuration depicted. In addition, the central interface sections 23 may include a combination of optical fibers and electrically conductive wires; the number of optical fibers and electrically conductive wires may be varied as desired. In one application, the pair of connectors may be used in an underwater environment in which water may be present between the central interface sections 23.

Upper housing 22 is generally rectangular and has a generally flat front or mating face 24, a generally flat, oppositely facing rear face 25 and a generally circular cavity 26 therebetween in which the central interface section 23 is positioned. A pair of generally identical and oppositely facing sidewalls 27 extend between the front face 24 and the rear face 25. A pair of generally identical and oppositely facing end walls 28 extend between the front face 24 and the rear face 25 and interconnect the sidewalls 27. Upper housing 22 may be formed of a variety of materials including metals or resins. In one embodiment, upper housing 22 may be formed of stainless steel.

A pair of stepped bores 31 are positioned in opposite corners of the upper housing 22 and extend between the front face 24 and the rear face 25. Each stepped bore 31 is configured to receive a shoulder bolt 32 therethrough for securing the upper connector 21 to the lower connector 41. Other components and mechanisms may be used to secure the upper connector 21 and the lower connector 41 together. Upper housing 22 includes a generally rectangular, horizontally extending clip retention section 33 generally adjacent and extending generally parallel to the front face 24 for securing retention clip 60 to the upper housing 22.

Lower housing 42 of lower connector 41 is generally rectangular and has a generally planar front or mating face 44 and an oppositely facing rear face 45. A generally circular cavity 46 extends between the front face 44 and the rear face 45 for receiving a central interface section 23 therein. A pair of generally identical and oppositely facing sidewalls 47 extend between the front face 44 and the rear face 45. A pair of oppositely facing end walls 48 extend between the front face 24 and the rear face 44 and interconnect the sidewalk 47. The front face 44 of lower connector 41 includes a pair of threaded bores 51 in opposite corners thereof. The threaded bores 51 are configured to receive the threaded ends of shoulder bolts 32 therein to connect the upper connector 21 to the lower connector 41.

Each sidewall 47 has a generally elongated generally rectangular guide and retention rail 52 extending along and generally adjacent to front face 44. The guide and retention rail 52 has curved end sections 53 that act as a lead-in to guide or funnel the guide and retention rail 52 into the guide openings 63 in the retention clip 60 as described below.

Upper connector 21 may include a pair of retention clips 60 that interact with guide and retention rails 52 of the lower connector 41 during lateral sliding of the connectors as depicted by Arrow "A" to permit the upper connector 21 and the lower connector 41 to mate with each other and to secure the two connectors together once mated. Retention clip 60 is configured as a resilient wire-form with an upper section 61 and lower section 62. The upper section 61 is configured to secure the retention clip 60 to the upper housing 22. The lower section 62 is configured to slidingly engage the guide and retention rail 52 of lower connector 41.

Figure 4:
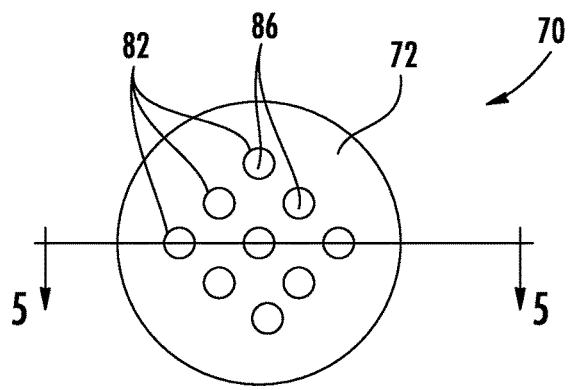
FIG. 4 is a bottom plan view of a lens block for use with the connectors of FIG. 1.
Figure 5:
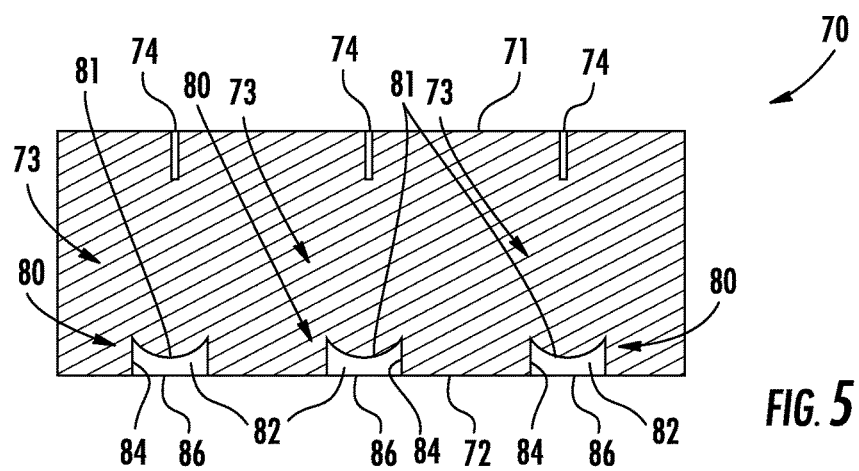
FIG. 5 is a section taken generally along Line 5-5 of FIG. 4.
Figure 6:
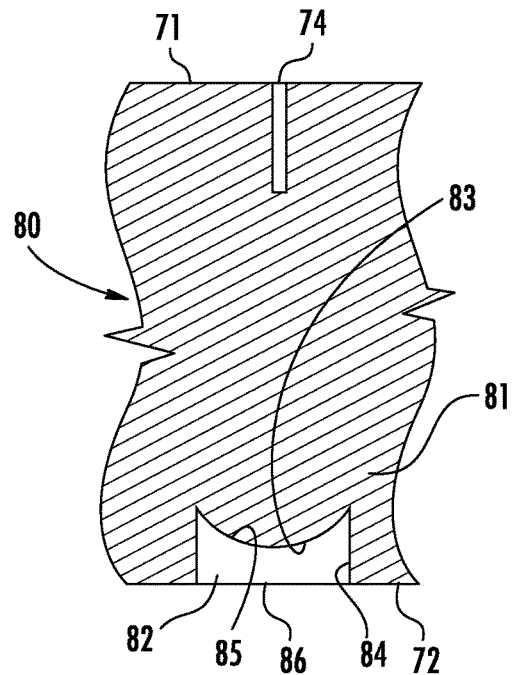
FIG. 6 is an enlarged fragmented view of a portion of FIG. 5.

The central interface sections 23 of the upper connector 21 and lower connector 41 may be substantially identical. Central interface section 23 supports a plurality of optical fibers 100 that are optically connected to a lens block 70. Referring to FIGS. 4-6, the lens block 70 has a rear face 71 and an oppositely facing front face 72 with a plurality of generally parallel optical paths 73 extending therebetween. Rear face 71 of lens block 70 may have an optical fiber receiving bore 74 aligned with each optical path 73 and in which an end 101 (FIG. 3) of an optical fiber 100 may be secured. Lens block 70 may be formed of an optical grade polymer capable of being injection molded. The lens block 70 may have an index of refraction generally matching that of the optical fiber 100 in order to reduce reflection and other consequences of differences in the indices of refraction. In one example, the optical fiber 100 may have an index of refraction of approximately 1.46 and the lens block 70 may have an index of refraction of approximately 1.50. Examples of optical grade polymers materials from which lens block 70 may be formed include cyclic olefin copolymer and polyetherimide.

Lens block 70 has a beam expanding and collimating element 80 forming a portion of each optical path 73 and positioned adjacent the front face 72 of the lens block. Beam expanding and collimating element 80 includes a first lens 81 and a second lens 82. First lens 81 may be integrally formed with the lens block 70. The first lens 81 may have a first lens surface 83 that defines a generally convex lens. The front face 72 of lens block 70 may be configured with a recess 84 aligned with each optical path 73 and with the first lens surface 83 defining the lower or rearward surface of the recess.

A second lens 82 is positioned within each recess 84 and has a second lens surface 85 generally complimentary in shape to the first lens surface 83 (i.e., concave) of the first lens 81. The second lens surface 85 is positioned in contact with the first lens surface 83 and optically adjacent the first lens surface so that the first lens 81 and the second lens 82 will essentially act as a compound lens to redirect the light. The second lens 82 may be formed of a material having a lower index of refraction than lens block 70. In an example in which the upper connector 21 and the lower connector 41 will be submersed in sea water, the index of refraction of the second lens 82 may be chosen to generally match that of sea water (i.e., approximately 1.35. The first lens surface 83 and the second lens surface 85 are curved so that, together with the change in the indices of refraction between the first lens 81 and the second lens 82, light traveling through the lens block 70 along the optical path 73 is redirected by the first lens and the second lens so as to be collimated or become generally parallel to the axis 103 through the optical fiber 100. The front surface 86 of second lens 82 is generally planar and generally perpendicular to the optical fiber axis 103 to minimize its effect on the collimated light exiting from the second lens.

Although the first lens 81 is depicted with a convex first lens surface 83 and the second lens 82 is depicted with a concave second lens surface 85, the shapes could be reversed by adjusting the refractive indices of the lenses. For example, while the first lens 81 has a higher index of refraction and the second lens 82 has a lower index of refraction, the shapes of the lens surfaces may be reversed and the materials from which the lenses are manufactured reversed to achieve the desired expanded and collimated beam characteristics.

In one embodiment, the lens block 70 may be formed as a single molded component of an optical grade polymer. The optical fiber receiving bores 74 are formed in the rear face 71 and the plurality of recesses 84 are formed in the front face 72 to create the plurality of first lenses 81 aligned with the bores 74. As such, each of the first lenses 81 is integrally formed with lens block 70 and within optical path 73. After the lens block 70, which includes the first lenses 81, is formed, the second lenses 82 may be formed by filling the recesses 84 with a relatively low index of refraction material such as a polymer (e.g., a fluoropolymer) or an epoxy. The polymer or epoxy may be cured by any process such as thermal, chemical or UV. The front surface 86 of the second lens 82 may be polished to be planar and generally perpendicular to optical axis 103.

In an alternate process, second lenses 82 may be formed by over-molding the lens block 70 with a second relatively low index of refraction material to fill the recesses 84. In some circumstances, the front surfaces 86 of the second lenses 82 may not require polishing to achieve the desired optical characteristics. Regardless of the manner in which the second lenses 82 may be formed, an anti-reflective coating may be applied to the front surface 86 to enhance optical performance if desired.

Figure 7:
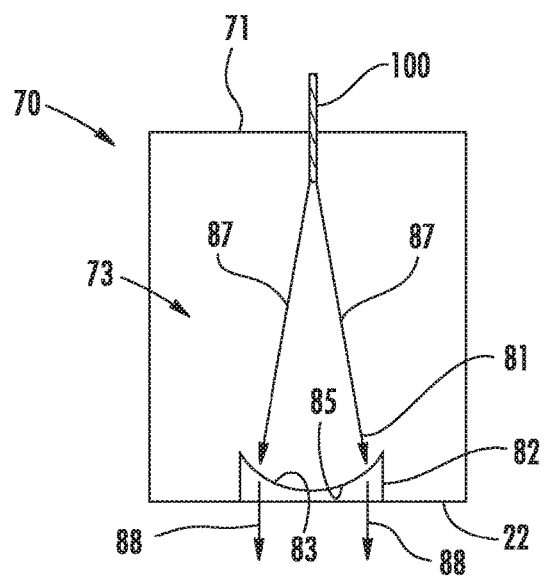
FIG. 7 is a diagrammatic view of a portion of the lens block of FIG. 4 depicting light passing therethrough.

Referring to FIG. 7, light from optical fiber 100 will defuse or expand in a generally conical manner (depicted by diverging lines 87) as it exits the optical fiber 100 and travels through the lens block 70 along optical path 73. As the light travels through the first lens surface 83 of first lens 81 and the second lens surface 85 of second lens 82, the light is redirected in a collimated manner (depicted by generally parallel lines 88) so as to exit second lens 82 generally perpendicular to the front surface 86 of the second lens.

Figure 10:
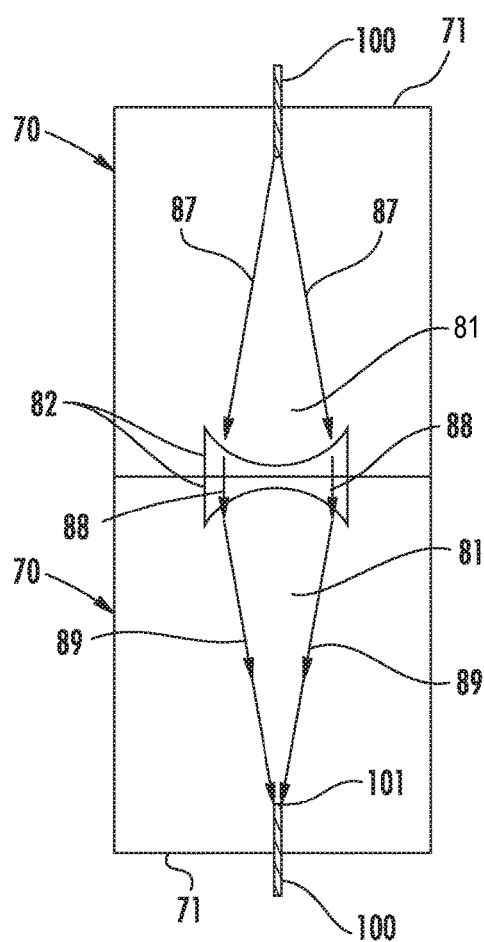
FIG. 10 is a diagrammatic view of a portion of a pair of mating blocks depicting light passing therethrough.
Figure 8:
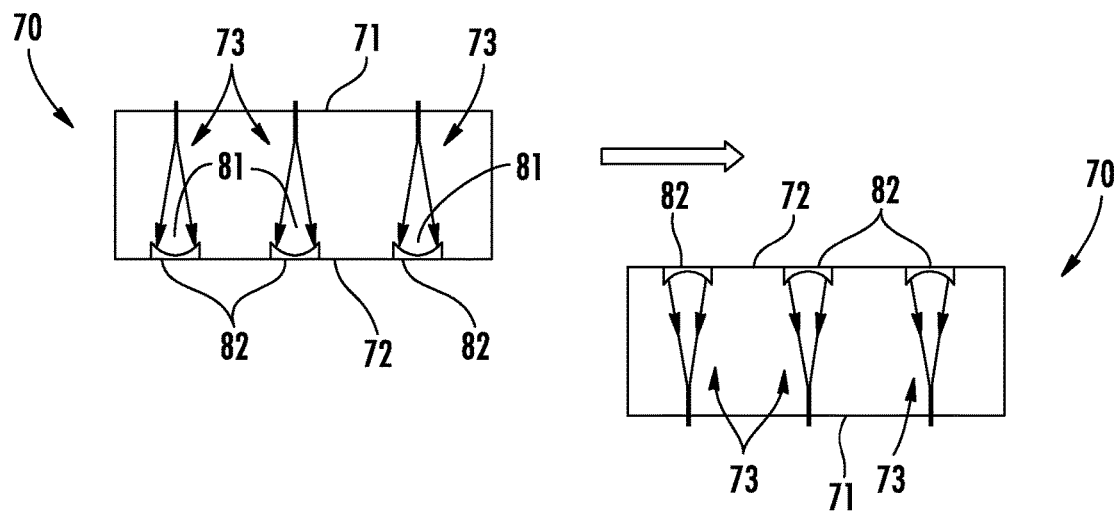
FIG. 8 is a diagrammatic view of a pair of lens blocks offset from each other prior to lateral mating.
Figure 9:
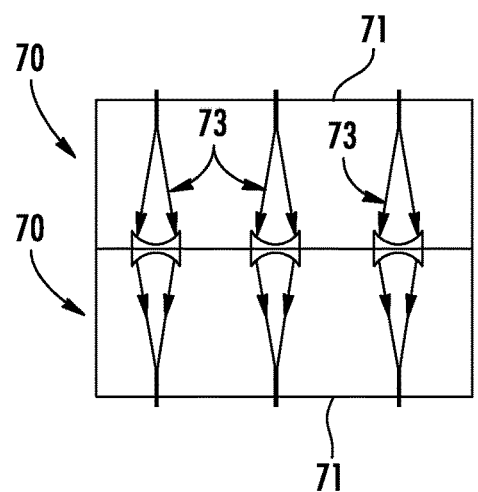
FIG. 9 is a diagrammatic view of the lens blocks of FIG. 8 mated together.

In the configuration of the connectors depicted in FIGS. 1-3, the connectors are slid laterally to align each of the optical fibers 100 of the upper connector 21 with one of the optical fibers of the lower connector 41. As depicted in FIGS. 8-9, the lens block 70 of each connector and their optical paths 73 are initially laterally offset and then slid laterally until they are aligned. Once the connectors are aligned, light passing from optical fiber 100 of the upper connector 21 passes through the lens block 70 of the upper connector 21. The light diffuses through the lens block 70 and is subsequently collimated as it passes through first lens 81 and second lens 82 as depicted in FIG. 10. The collimated light passes through the front surface 86 of the second lens 82 and into the lower connector 41. The collimated light passes through the front surface 86 of the second lens 82 of the lower connector 41. The second surface 85 of the second lens 82 and the first lens surface 83 of the first lens 81 redirect the light from its collimated state and focus the light (as depicted by converging lines 89) on the end 101 of the optical fiber 100 adjacent the rear face 71 of the lens block 70 of the lower connector 41.

Figure 11:
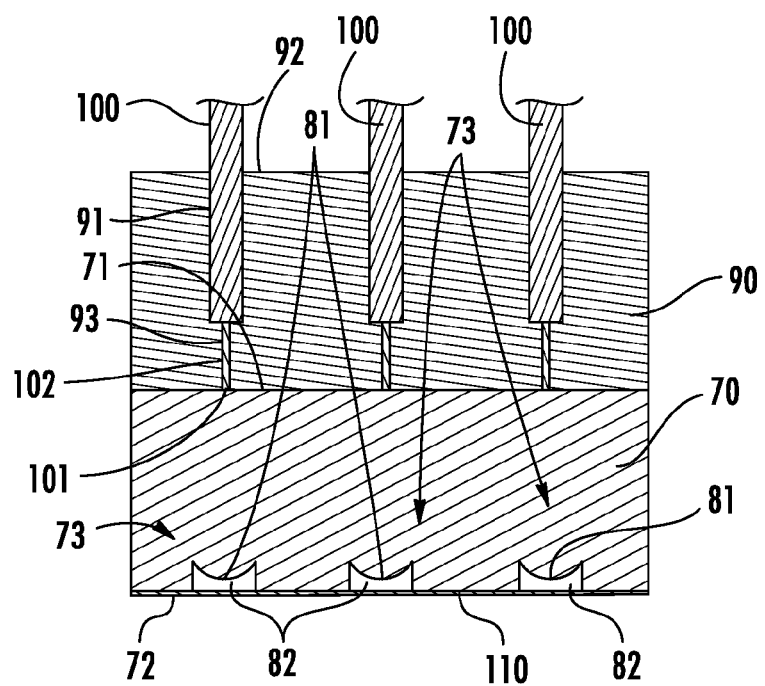
FIG. 11 is an alternate embodiment of a lens block.
Figure 12:
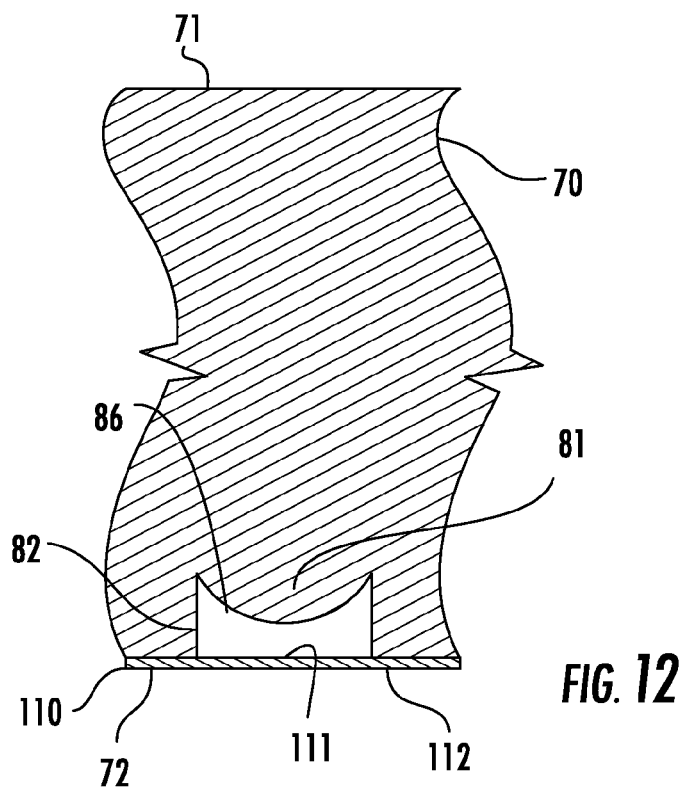
FIG. 12 is an enlarged, fragmented view of a portion of the lens block of FIG. 11.

In an alternate embodiment depicted in FIGS. 11-2, the lens block 70 may not include the optical fiber receiving bores 74. In such case, the optical fibers 100 may be positioned within a fiber holder or ferrule 90 that secures and positions the optical fibers 100 in a precise manner. The ferrule 90 may have enlarged bores 91 adjacent a rear face 92 of the ferrule for receiving the optical fiber. A smaller bore 93 may extend from the larger bore 91 to the front face 94. Optical fibers 100 are inserted into the bores 91 with the optical fiber core 102 extending into the smaller bores 93. The end 101 of the optical fibers 100 may be polished as is known. The ferrule 90 with the optical fibers 100 therein may be affixed to the rear face 71 of the lens block 70 such as with an index matching epoxy.

In another aspect of the Present Disclosure, an additional layer such as a compliant layer 110 may be positioned on or applied to the front surface 86 of each second lens 82. If desired, the compliant layer 110 may extend across the entire front face 72 of the lens block 70 in a generally planar manner. The compliant layer 110 may be generally planar with a rear surface 111 that engages the front surface 86 of the second lenses 82 and an oppositely facing front surface 112. The rear surface 111 and front surface 112 may both be generally at right angles to the collimated light passing through the front surface 86 of second lens 82 to minimize the optical impact of the compliant layer 110.

To further minimize the optical impact of the compliant layer 110, it may be desirable to match the index of refraction of the compliant polymer layer to that of the second lens 82. For example, if the second lens 82 has an index of refraction of approximately 1.35, it may be desirable for the compliant layer 110 also have an index of refraction of approximately 1.35. In one example in which the second lens 82 is formed of a fluoropolymer, the complaint layer 110 may be formed of a fluorourethane. In another example, it may be desirable for the compliant layer 110 be formed of a material having a low coefficient of friction such as polytetrafluoroethylene to facilitate lateral sliding of the lens blocks 70 as depicted in FIG. 2.

Compliant layer 110 permits the elimination of an air gap between the lens assemblies of the upper connector 21 and the lower connector 41. The elimination of the air gap between the two sets of lenses is useful to eliminate Fabry-Perot interference. Fabry-Perot interference may cause a significant amount of reflection within an optical system and thus necessitate the use of anti-reflective coatings. The addition of the compliant layer 110 in connection with the system described herein may permit the elimination of the anti-reflective coating.

Figure 13:
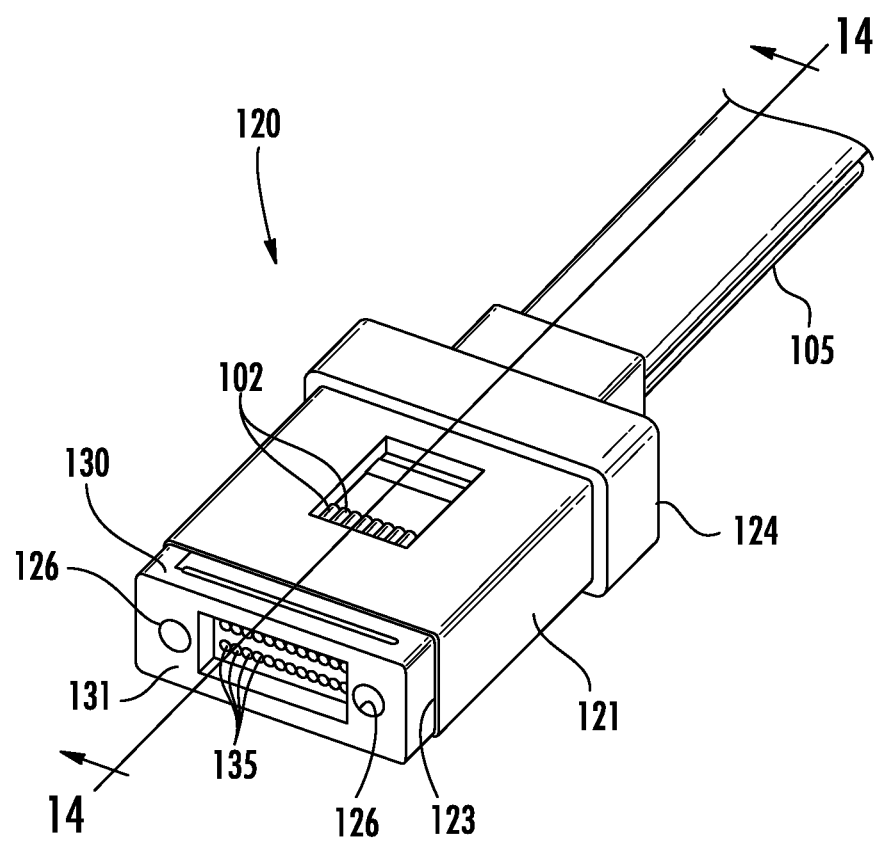
FIG. 13 is a perspective view of an alternate embodiment of a connector incorporating a lens plate disclosed herein.

In addition to connectors that may be mated by lateral sliding movement, the concepts disclosed herein may also be used with optical fiber connectors that mate in a direction generally along the longitudinal axes of the optical fibers. FIG. 13 depicts a multi-fiber MT-type lensed connector assembly 120. The connector assembly 120 includes a ferrule body 121 with a beam expanding and collimating member such as tens plate 130 terminated to a multi-fiber cable 105 having a plurality of optical fibers 100 therein. As depicted, connector assembly 120 includes two rows of twelve optical fibers 100, although the connector assembly may be configured with greater or fewer optical fibers if desired.

Figure 14:
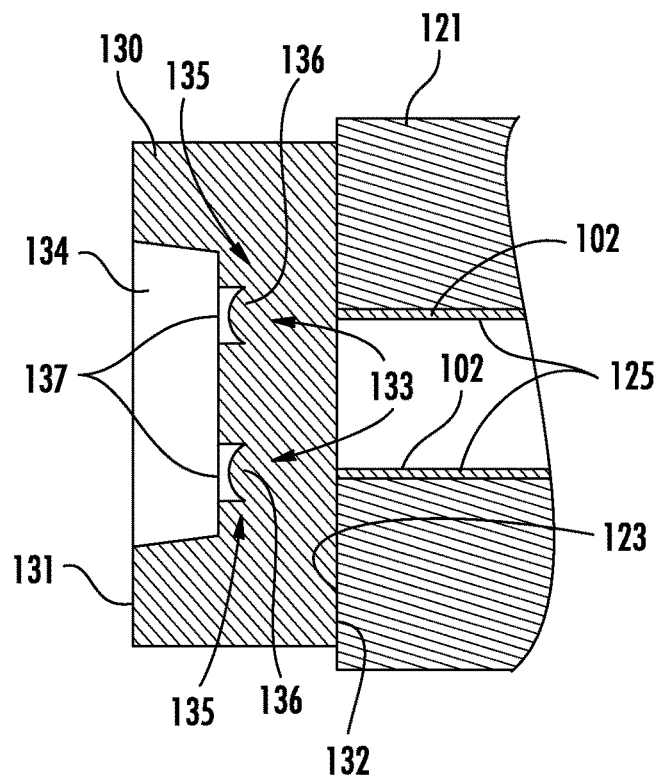
FIG. 14 is a fragmented side view of a portion of the ferrule and lens plate assembly taken generally along Line 14-14 of FIG. 13.

The ferrule body 121 is generally rectangular and has a generally flat front face 123 and a generally flat rear face 124. In the embodiment depicted in FIG. 13, ferrule body 121 includes two rows of twelve generally cylindrical optical fiber receiving holes or bores 125 (FIG. 14) that extend through the ferrule body 121 to the front face 123. In addition, ferrule body 121 may also include a pair of alignment holes or receptacles 126 positioned on opposite sides of the array of fiber receiving holes 125. As depicted, alignment holes 126 are generally cylindrical and extend from front face 123 to rear face 124. The alignment holes 126 are configured to receive a post therein to facilitate alignment of a mating pair of connectors.

Ferrule body 121 may be formed of a resin capable of being injection molded such as polyphenylene sulphide or polyetherimide and may include an additive such as silica ($SiO_2$) to increase the dimensional characteristics, strength and stability of the resin. One of the optical fibers 100 of multi-fiber cable 105 is positioned within each fiber receiving hole 125. The front face of the ferrule body 121 and the end faces 101 of the optical fibers 100 adjacent the front face 123 are polished to a desired finish.

Lens plate 130 is generally rectangular and has a front face 131 and a generally flat rear face 132. Lens plate 130 may be formed of an optical grade resin as described above relative to lens block 30. A recess 134 may be centrally located in the front face 131. A plurality of optical paths 133 extend between the rear face 132 and the recess 134, with each optical path being aligned with one of the optical fibers 100. Each optical path 133 may be formed as described above with a beam expanding and collimating element 135 adjacent the recess 134. Each beam expanding and collimating element 135 may include a first lens 136 and a second lens 137 as described above.

Figure 15:
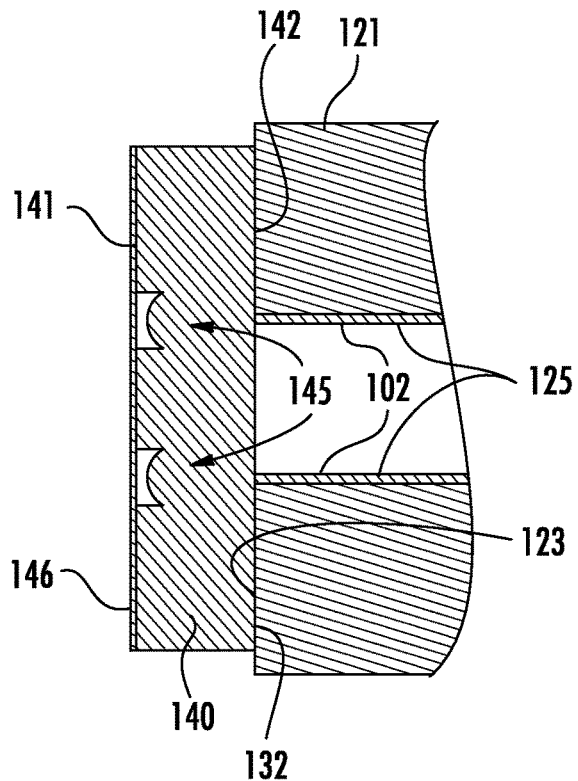
FIG. 15 is an alternate embodiment of the ferrule and lens plate assembly of FIG. 14.

In an alternate embodiment depicted in FIG. 15, the lens plate 140 is generally rectangular and has a front face 141 and a generally flat rear face 142. The lens plate 140 does not include a recess in the front face 191 so that the beam expanding and collimating elements 145 are positioned adjacent the front face 141. A compliant layer 146 may be included on the front face 141 of lens plate 140. As described above, the compliant layer 146 may be provided to eliminate or reduce Fabry-Perot interference, thus eliminating the need for anti-reflective coatings on the lenses.

Figure 16:
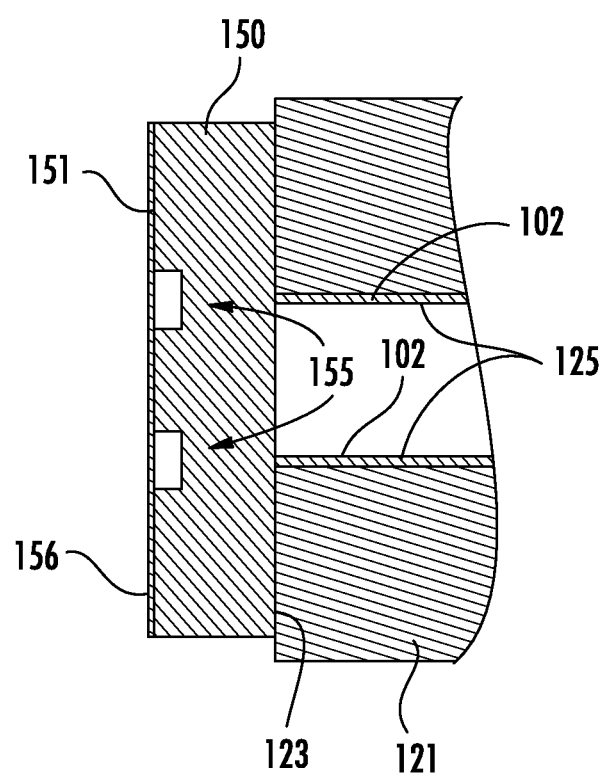
FIG. 16 is an alternate embodiment of the ferrule and lens plate assembly of FIG. 14.

In still another alternate embodiment depicted in FIG. 16, the beam expanding and collimating elements 155 within each optical path 153 of lens plate 150 may include a graded- or gradient-index lens adjacent the front face 151 of the lens plate 150. A compliant layer 156 may be provided along the front face 155 as described above to eliminate or reduce Fabry-Perot interference and thus eliminate the need for anti-reflective coatings.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

While a preferred embodiment of the Present Disclosure is shown and described, it is envisioned that those skilled in the art may devise various modifications without departing from the spirit and scope of the foregoing Description and the appended Claims.

What is claimed is:

1. An optical fiber assembly comprising:
    a body, the body supporting a lens block and a plurality of optical fibers, each optical fiber including an optical fiber axis, the optical fiber axes being generally parallel; and
    a plurality of beam expanding and collimating elements positioned in the lens block, each element being aligned with the optical fiber axis of one of the optical fibers and including a first lens and a second lens, the first lens including a generally arcuate first lens surface, the second lens including a generally arcuate second lens surface, the first lens surface and the second lens surface being generally complementary in shape and in contact with each other, each lens having a different index of refraction.

2. The optical fiber assembly of claim 1, wherein the lens block includes the first lenses integrally formed therewith.

3. The optical fiber assembly of claim 1, wherein the lens block includes a refractive index of approximately 1.5.

4. The optical fiber assembly of claim 1, wherein the first lens is formed of a first material, and the second lens is formed of a second material, the first material having a higher refractive index than the second material.

5. The optical fiber assembly of claim 1, wherein the lens block includes a plurality of bores with one of the optical fibers positioned in each bore.

6. The optical fiber assembly of claim 5, wherein each of the optical fibers is secured within one of the bores by an index matched medium.

7. The optical fiber assembly of claim 1, wherein each of the optical fibers is positioned generally adjacent a rear face of the lens block.

8. The optical fiber assembly of claim 1, wherein each of the second lenses includes a front surface opposite the second lens surface, the front surface being generally planar.

9. The optical fiber assembly of claim 8, wherein the front surfaces of the second lenses lie in a generally common plane.

10. The optical fiber assembly of claim 9, further including a compliant polymer layer on each front surface.

11. The optical fiber assembly of claim 1, wherein the lens block includes a plurality of recesses in a forward surface thereof, each of the first lenses being formed in one of the recesses and each of the second lenses being positioned in one of the recesses.

12. An optical fiber assembly comprising:
    a housing having a plurality of optical fibers, each optical fiber including an optical fiber axis, the optical fiber axes being generally parallel; and
    a plurality of beam expanding and collimating elements positioned in a lens block, each element being aligned with the optical fiber axis of one of the optical fibers and including a first lens and a second lens, the first lens including a generally arcuate first lens surface, the second lens including a generally arcuate second lens surface, the first lens surface and the second lens surface being generally complementary in shape and in contact with each other, each lens having a different index of refraction.

13. The optical fiber assembly of claim 12, wherein the lens block includes the first lenses integrally formed therewith.

14. An optical fiber lens assembly comprising:
    a lens block, the lens block being formed of an optical grade polymer and including a plurality of first lenses integrally formed therewith;
    a plurality of generally parallel optical paths, each optical path including a beam expanding and collimating element, each element including one of the first lenses and a second lens positioned in the lens block, the first lens having a first index of refraction and including a generally arcuate first lens surface, the second lens having a second index of refraction and including a generally arcuate second lens surface, the first index of refraction being different from the second index of refraction, the first lens surface and the second lens surface being generally complementary in shape and in contact with each other.

15. The optical fiber assembly of claim 14, further including a compliant polymer layer on each front surface.

16. The optical fiber assembly of claim 15, wherein the compliant layer includes a relatively low coefficient of friction.

\* \* \* \* \*